United States Patent
Zhang et al.

(10) Patent No.: US 12,222,606 B2
(45) Date of Patent: Feb. 11, 2025

(54) DIMMING GLASS, FABRICATION METHOD THEREOF AND TRANSPORTATION DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Donghua Zhang, Beijing (CN); Hongliang Yuan, Beijing (CN); Qi Zheng, Beijing (CN); Kangdi Zhou, Beijing (CN); Zhangxiang Cheng, Beijing (CN); Xiaoqiang Zhang, Beijing (CN); Yaqian Li, Beijing (CN); Zhikai Wu, Beijing (CN)

(73) Assignees: BEIJING BOE OPTOELECTRONICS TECHNOLOGY CO., LTD., Beijing (CN); BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 17/914,681

(22) PCT Filed: Oct. 26, 2021

(86) PCT No.: PCT/CN2021/126251
§ 371 (c)(1),
(2) Date: Sep. 26, 2022

(87) PCT Pub. No.: WO2022/199011
PCT Pub. Date: Sep. 29, 2022

(65) Prior Publication Data
US 2024/0264492 A1    Aug. 8, 2024

(30) Foreign Application Priority Data
Mar. 23, 2021   (CN) .......................... 202110308491.6

(51) Int. Cl.
*G02F 1/1339*   (2006.01)
*G02F 1/1337*   (2006.01)
(Continued)

(52) U.S. Cl.
CPC .... *G02F 1/13394* (2013.01); *G02F 1/133776* (2021.01); *G02F 1/134309* (2013.01); *G02F 1/1347* (2013.01); *G02F 2201/122* (2013.01)

(58) Field of Classification Search
None
See application file for complete search history.

(56) References Cited

U.S. PATENT DOCUMENTS

2017/0205648 A1*   7/2017   Xie ..................... G02F 1/13439
2017/0276991 A1*   9/2017   Fan ..................... G02F 1/13394
(Continued)

FOREIGN PATENT DOCUMENTS

CN   103545340 A   1/2014
CN   105278175 A   1/2016
(Continued)

OTHER PUBLICATIONS

First Office Action issued on Aug. 3, 2022 for application No. CN202110308491.6 with English translation attached.

*Primary Examiner* — Ryan Crockett
(74) *Attorney, Agent, or Firm* — Nath, Goldberg & Meyer; Joshua B. Goldberg

(57) ABSTRACT

An embodiment of the present disclosure provides a dimming glass, including: a glass substrate; and at least two dye liquid crystal cells on the glass substrate. The dye liquid crystal cells are mutually stacked and bonded with each other via an adhesive layer. The dye liquid crystal cell includes a central region and a peripheral region surrounding a periphery of the central region. The dye liquid crystal cell includes a cell gap adjusting structure in at least the periph- (Continued)

eral region, which is configured to adjust a cell gap of the dye liquid crystal cell to be consistent. An embodiment of the present disclosure further provides a transportation device, including the dimming glass described above and used as a window glass of the transportation device.

16 Claims, 11 Drawing Sheets

(51) Int. Cl.
*G02F 1/1343* (2006.01)
*G02F 1/1347* (2006.01)

(56) References Cited

U.S. PATENT DOCUMENTS

2021/0247636 A1* 8/2021 Xiao .................. G02F 1/13475
2021/0333599 A1* 10/2021 Zhang .............. G02F 1/133345

FOREIGN PATENT DOCUMENTS

| | | |
|---|---|---|
| CN | 105652528 A | 6/2016 |
| CN | 105911774 A | 8/2016 |
| CN | 111580314 A | 8/2020 |
| CN | 111965863 A | 11/2020 |
| CN | 111965878 A | 11/2020 |
| CN | 111983863 A | 11/2020 |
| CN | 112099271 A | 12/2020 |
| CN | 112965304 A | 6/2021 |
| EP | 1072931 A2 | 1/2001 |
| JP | 02212816 A | 8/1990 |
| WO | 2017156809 A1 | 9/2017 |

\* cited by examiner

DIMMING GLASS, FABRICATION METHOD THEREOF AND TRANSPORTATION DEVICE

This is a National Phase Application filed under 35 U.S.C. 371 as a national stage of PCT/CN2021/126251, filed on Oct. 26, 2021, an application claiming the benefit of priority to Chinese Patent Application No. 202110308491.6 filed to the National Intellectual Property Administration of P.R. China on Mar. 23, 2021, the contents of which are incorporated herein in their entirety by reference.

TECHNICAL FIELD

Embodiments of the present disclosure belong to the field of display technology, and specifically relates to a dimming glass, a fabrication method thereof and a transportation device.

BACKGROUND

Currently, the dimming glass is more and more widely applied to the fields of building and transportation, and the dye liquid crystal dimming glass has become an interest of customers of automobiles, high-speed rails, passenger aircrafts and the like. In order to reduce transmittance of the dye liquid crystal dimming glass in a dark state and improve the contrast, a dual dye liquid crystal cell scheme is typically adopted for the dye liquid crystal dimming glass used in the transportation field such as in vehicle windows.

SUMMARY

Embodiments of the present disclosure provide a dimming glass, a fabrication method thereof and a transportation device.

In a first aspect, an embodiment of the present disclosure provides a dimming glass, including: a glass substrate; and at least two dye liquid crystal cells on the glass substrate; wherein the dye liquid crystal cells are mutually stacked and bonded with each other via an adhesive layer; and the dye liquid crystal cell includes a central region and a peripheral region surrounding a periphery of the central region. The dye liquid crystal cell includes a cell gap adjusting structure in at least the peripheral region, and the cell gap adjusting structure is configured to adjust a cell gap of the dye liquid crystal cell to be consistent.

In some embodiments, the dye liquid crystal cell includes a first substrate, a second substrate, dye liquid crystals, and a plurality of support elements, the first substrate and the second substrate are assembled to form a cell gap in which the dye liquid crystals are disposed; the plurality of support elements are distributed between the first substrate and the second substrate at intervals, and configured to support the first substrate and the second substrate; and the support element includes a body; and the cell gap adjusting structure includes a dielectric elastomer and an electrode structure; the dielectric elastomer is in the body and the electrode structure is on the first substrate and/or the second substrate, and an orthographic projection of the electrode structure on the first substrate is overlapped with an orthographic projection of the support element on the first substrate.

In some embodiments, the first substrate includes a first base and a first electrode layer on the first base; the second substrate includes a second base and a second electrode layer on the second base; and the support elements are on a side of the first electrode layer facing away from the first base and on a side of the second electrode layer facing away from the second base.

In some embodiments, the electrode structure includes a third electrode and a fourth electrode; the third electrode is on the first base and between the first electrode layer and the support elements; and the third electrode and the first electrode layer are mutually insulated; and the fourth electrode is on the second base and between the second electrode layer and the support elements; and the fourth electrode and the second electrode layer are mutually insulated.

In some embodiments, the first substrate includes a first base, a first electrode layer and a second electrode layer, the first electrode layer and the second electrode layer are sequentially stacked on the first base, and mutually insulated; the second substrate includes a second base; and the first electrode layer and the second electrode layer are located between the support elements and the first base, the first electrode layer is a plane electrode, and the second electrode layer is a slit electrode.

In some embodiments, the electrode structure includes a third electrode and a fourth electrode mutually insulated; the third electrode and the fourth electrode are sequentially stacked on the second substrate and located between the second substrate and the support elements, or, the third electrode and the fourth electrode are sequentially stacked on the first substrate and located between the second electrode layer and the support elements, and the third electrode and the second electrode layer are mutually insulated; and the third electrode is a plane electrode, and the fourth electrode is a slit electrode.

In some embodiments, the first electrode layer includes a first pattern and a second pattern mutually insulated; an orthographic projection of the first pattern on the first base is overlapped with an orthographic projection of the support elements on the first base; and an orthographic projection of the second pattern on the first base is overlapped with an orthographic projection of other region than a region where the support elements are located on the first base.

In some embodiments, the first pattern and the second electrode layer are reused as the electrode structure.

In some embodiments, the second electrode layer includes a third pattern and a fourth pattern mutually insulated; and an orthographic projection of the third pattern on the second base is overlapped with an orthographic projection of the support elements on the second base; and an orthographic projection of the fourth pattern on the second base is overlapped with an orthographic projection of other region than the region where the support elements are located on the second base.

In some embodiments, the third pattern and the first electrode layer are reused as the electrode structure.

In some embodiments, the first pattern and the third pattern are reused as the electrode structure.

In some embodiments, the first substrate further includes a first alignment film; the second substrate further includes a second alignment film; the first alignment film and the second alignment film are in contact with two ends of the support elements, respectively; and the first alignment film and the second alignment film have a same alignment direction.

In some embodiments, a material of the dielectric elastomer includes acrylic or polyurethane; the body is made of a photoresist material; the dye liquid crystals include liquid crystals and dichroic dyes; and the adhesive layer is made of a polyvinyl butyral material.

In a second aspect, an embodiment of the present disclosure further provides a transportation device, including the dimming glass described above, which is used as a window glass of the transportation device.

In a third aspect, an embodiment of the present disclosure further provides a method for fabricating the dimming glass as described above, including: forming dye liquid crystal cells, and forming a cell gap adjusting structure in the dye liquid crystal cell; and sequentially attaching the dye liquid crystal cells to a glass substrate via an adhesive layer through heating and pressurizing. A cell gap of the dye liquid crystal cell is adjusted to be consistent by the cell gap adjusting structure during the attaching process.

In some embodiments, forming the dye liquid crystal cell includes: forming a first substrate, a second substrate and a support element; wherein the support element is formed on the first substrate or the second substrate; forming the cell gap adjusting structure includes: forming a dielectric elastomer and an electrode structure. A material of the dielectric elastomer is mixed with a material of a body of the support element to form a pattern of the support element through a patterning process; and in formation of the first substrate and the second substrate, the electrode structure is formed on the first substrate and/or the second substrate through a patterning process or an evaporation process.

BRIEF DESCRIPTION OF DRAWINGS

Accompanying drawings are provided for a further understanding of the embodiments of the present disclosure and constitute a part of the specification. Hereinafter, these drawings are intended to explain the present disclosure together with the following embodiments, but should not be considered as a limitation to the present disclosure. The above and other features and advantages will become more apparent to those skilled in the art through detailed description of the exemplary embodiments with reference to the accompanying drawings, in which.

DETAIL DESCRIPTION OF EMBODIMENTS

Figure 1:
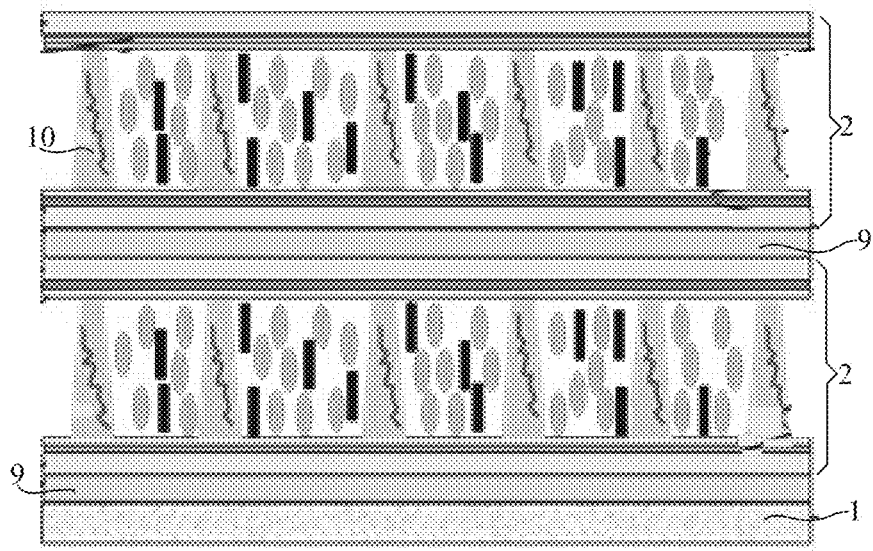
FIG. 1 is a schematic sectional view of a structure of a dye liquid crystal dimming glass in the related art.

In order to make those skilled in the art better understand the technical solutions in the embodiments of the present disclosure, the dimming glass, the fabrication method thereof and the transportation device provided in the embodiments of the present disclosure will be described in further detail below with reference to the accompanying drawings and specific implementations.

Embodiments of the present disclosure will be described more sufficiently below with reference to the accompanying drawings, but which may be embodied in different forms and should not be construed as limited to the embodiments set forth in the present disclosure. Rather, these embodiments are provided so that the present disclosure will be thorough and complete, and will fully convey the scope of the present disclosure to those skilled in the art.

The embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of regions, but are not intended to be limitative.

Referring to FIG. 1, in order to reduce transmittance of the dye liquid crystal dimming glass in a dark state and improve the contrast, a dual dye liquid crystal cell scheme is typically adopted for the dye liquid crystal dimming glass used in the transportation field such as in vehicle windows. That is, two dye liquid crystal cells 2 are provided on a glass substrate 1, and bonded with a PVB (polyvinyl butyral) adhesive 9.

Figure 2:
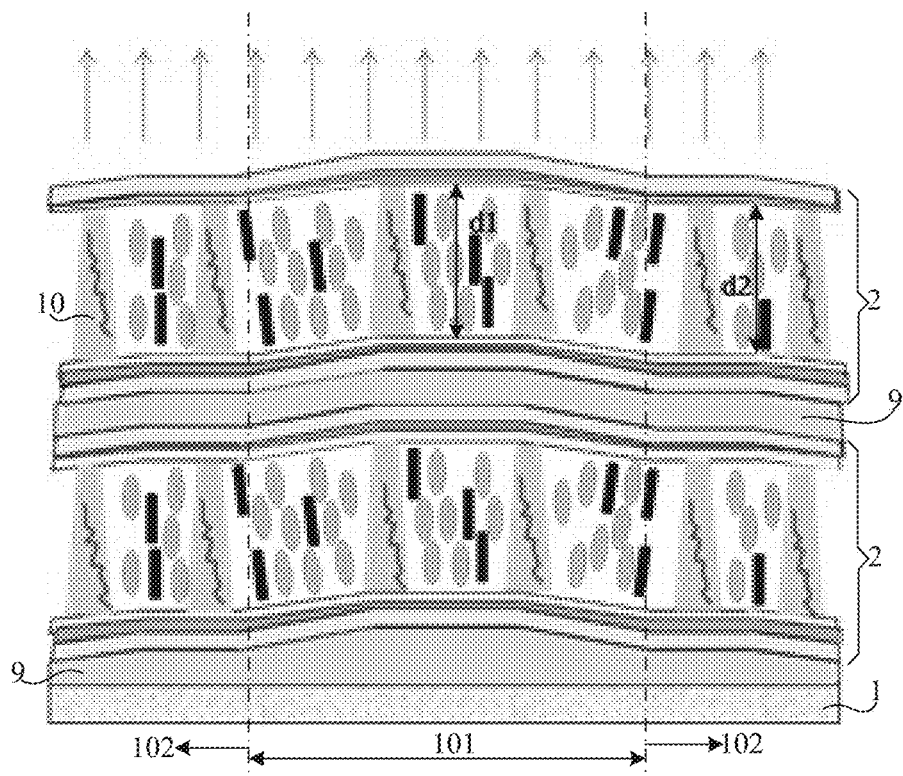
FIG. 2 is a schematic sectional view of a structure of inconsistent cell gaps of the dye liquid crystal cells in the dye liquid crystal dimming glass in the related art in a high-temperature and high-pressure bonding process.

Referring to FIG. 2, in the process of bonding the dye liquid crystal cells 2 under high temperature and high pressure conditions, since the PVB adhesive 9 has fluidity in the bonding process, the PVB adhesive 9 will flow from a peripheral region 102 to a central region 101 under the pressure during the bonding. As a result, the PVB adhesive 9 in the peripheral region 102 becomes thinner, and the PVB adhesive 9 is thicker in the central region 101 than in the peripheral region 102. The dimming glass is deformed under the stress of the PVB adhesive 9, so that a main PS 10, located in the peripheral region 102 of each dye liquid crystal cell 2 and configured to support upper and lower substrates, is reduced in height, and thus a cell gap d2 in the peripheral region 102 is reduced. Therefore, the cell gap d2 in the peripheral region 102 is smaller than the cell gap d1 in the central region 101, and dye liquid crystal molecules in the peripheral region 102 flow toward the central region 101, so that the peripheral region 102 tilts with respect to the central region 101, and local blackening may occur in an area with a smaller cell gap of the peripheral region 102.

Figure 3:
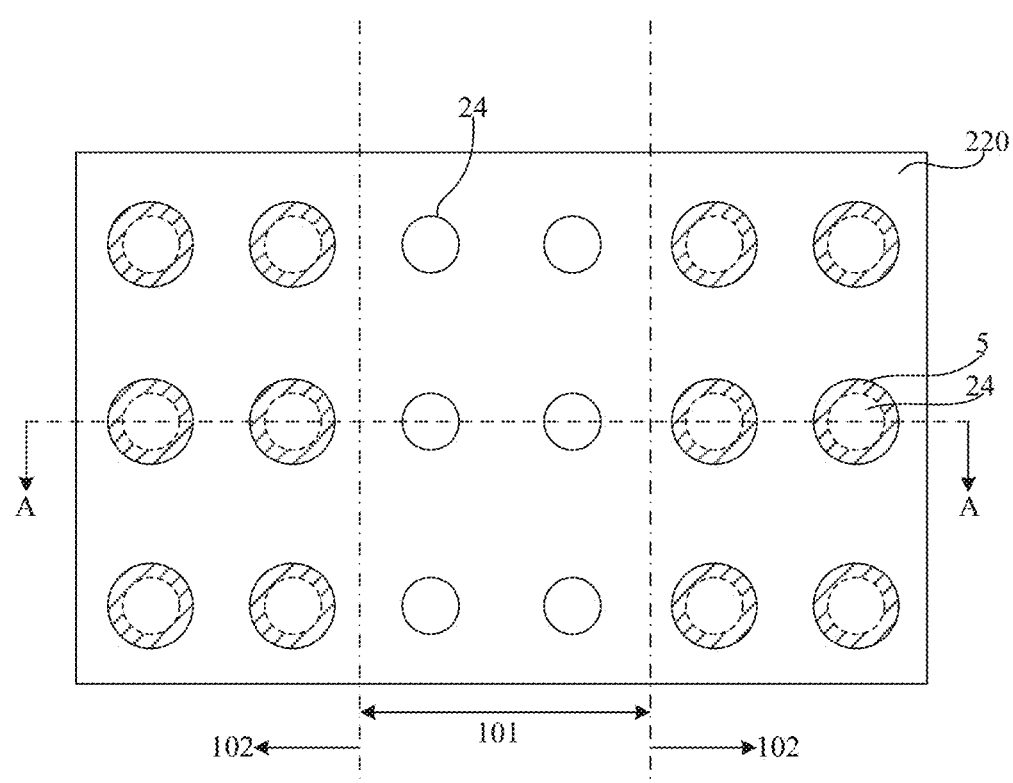
FIG. 3 is a schematic top view of a structure of a dimming glass according to an embodiment of the present disclosure.
Figure 4:
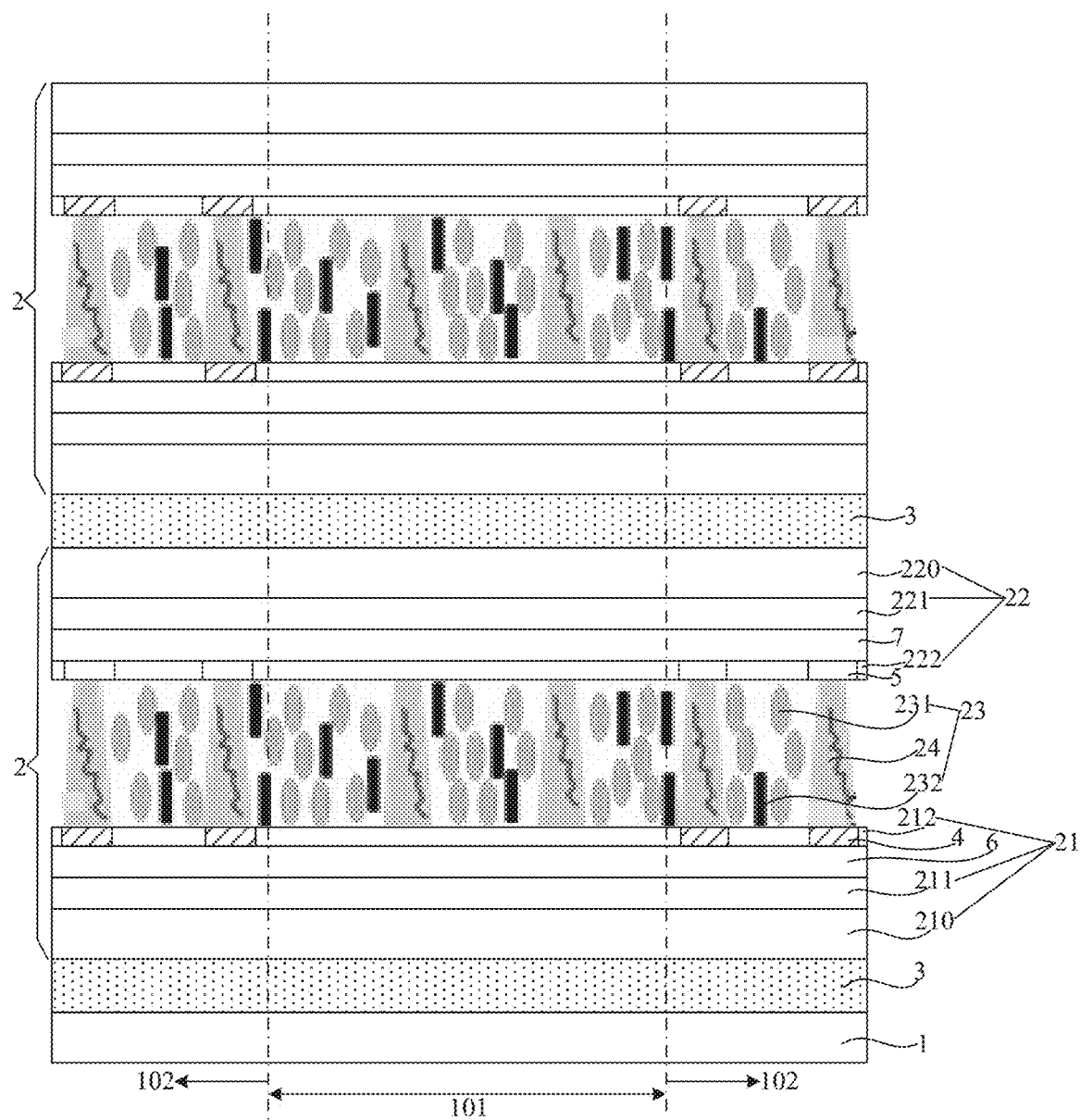
FIG. 4 is a schematic sectional view of a structure of the dimming glass of FIG. 3 along line AA.

In view of the local blackening problem in the peripheral region of the dye liquid crystal cell caused by the PVB adhesive flowing under the bonding pressure and causing the inconsistent cell gap in the peripheral region and central region of the dye liquid crystal cell during boding of the dual dye liquid crystal cells, an embodiment of the present disclosure provides a dimming glass which, referring to FIGS. 3 and 4, includes: a glass substrate 1; and at least two dye liquid crystal cells 2 on the glass substrate 1. The dye liquid crystal cells 2 are mutually stacked and bonded with each other via an adhesive layer 3. Each dye liquid crystal cell 2 includes a central region 101 and a peripheral region 102 surrounding a periphery of the central region 101. Each dye liquid crystal cell 2 is provided with a cell gap adjusting structure in at least the peripheral region 102 and configured to adjust a cell gap of the dye liquid crystal cell 2 to be consistent.

In some embodiments, the cell gap adjusting structure is provided merely in the peripheral region 102. Two dye liquid crystal cells 2 are provided.

In some embodiments, each dye liquid crystal cell 2 includes a first substrate 21, a second substrate 22, dye liquid crystals 23, and a plurality of support elements 24. The first substrate 21 and the second substrate 22 are assembled to form a cell gap in which the dye liquid crystals 23 are provided. The plurality of support elements 24 are distributed between the first substrate 21 and the second substrate 22 at intervals, and configured to support the first substrate 21 and the second substrate 22. Each support element 24 includes a body. The cell gap adjusting structure includes a dielectric elastomer in the body and an electrode structure. The electrode structure is provided on the first substrate 21 and the second substrate 22, and has an orthographic projection on the first substrate 21 overlapped with an orthographic projection of the support element 24 on the first substrate 21.

The dielectric elastomer is made of a material including acrylic or polyurethane. The body is made of a photoresist material. The dye liquid crystals 23 include liquid crystals 231 and dichroic dyes 232. The adhesive layer 3 is made of a polyvinyl butyral material.

In some embodiments, dichroic dye molecules in the dichroic dyes 232 are aligned in the same direction as liquid crystal molecules in the liquid crystal 231, and under an electric field, the liquid crystal molecules and the dichroic dye molecules are deflected and changed synchronously. The liquid crystal molecules may be opaque to light parallel to a major axis direction of the liquid crystal molecules, but transparent to light perpendicular to the major axis direction. The dichroic dye molecules dissolved in the liquid crystals 231 may absorb light parallel to the major axis direction of the liquid crystal molecules, and be transparent to light perpendicular to the major axis direction of the liquid crystal molecules. The absorption of the dichroic dye molecules to incident light and the transmission of the liquid crystal molecules to incident light are changed synchronously, so that on one hand, adjustment of a light amount transmitted through the dimming glass can be implemented, and on the other hand, the light transmittance of the dimming glass in a dark state can be further reduced while the contrast can be further improved.

Figure 5:
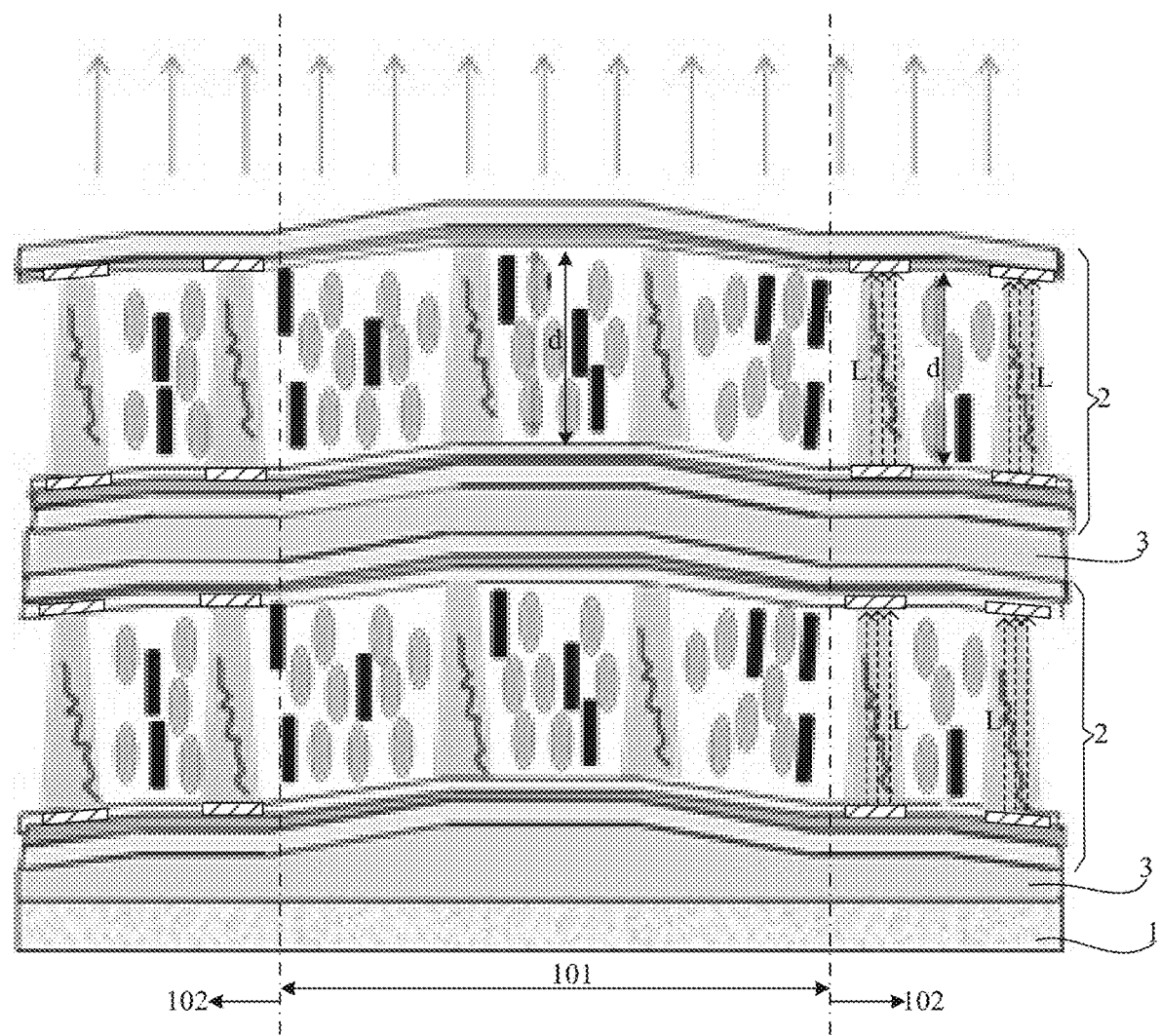
FIG. 5 is a schematic diagram of a structure showing the principle that a cell gap adjusting structure in the dimming glass according to an embodiment of the present disclosure adjusts the cell gaps of the dye liquid crystal cells to be consistent.

Referring to FIG. 5, in the process of bonding the dye liquid crystal cells 2 under high temperature and high pressure conditions, the electrode structure of the peripheral region 102 can generate, when being energized, a vertical electric field in which the dielectric elastomer extends along a power line direction L, and contracts on a plane perpendicular to the power line direction L so that the body is elongated along the power line direction L with deformation of the dielectric elastomer under the electric field, and contracts in the plane perpendicular to the power line direction L, thereby preventing height reduction of the support elements 24 caused by the fluidity of the adhesive layer 3 under the high temperature and high pressure, and thus preventing reduction of the cell gap d of the dye liquid crystal cell 2 in the peripheral region 102. Finally, it is ensured that the cell gap d of the dye liquid crystal cell 2 tends to be the same in the peripheral region 102 and in the central region 101, and the local blackening in the area with a smaller cell gap of the peripheral region 102 is avoided.

In some embodiments, referring to FIG. 4, the first substrate 21 includes a first base 210 and a first electrode layer 211 on the first base 210. The second substrate 22 includes a second base 220 and a second electrode layer 221 on the second base 220. The support elements 24 are located on a side of the first electrode layer 211 facing away from the first base 210 and on a side of the second electrode layer 221 facing away from the second base 220.

In some embodiments, the first electrode layer 211 is a full-plane electrode on the first base 210; and the second electrode layer 221 is a full-plane electrode on the second base 220. When the dimming glass is used for light control, under a vertical electric field formed between the first electrode layer 211 and the second electrode layer 221, liquid crystal molecules and dichroic dye molecules in the cell gap of the dye liquid crystal cell 2 can be synchronously deflected to implement adjustment of a light amount transmitted through the dimming glass.

In some embodiments, the electrode structure includes a third electrode 4 and a fourth electrode 5. The third electrode 4 is provided on the first base 210 and located between the first electrode layer 211 and the support elements 24. The third electrode 4 and the first electrode layer 211 are mutually insulated. The fourth electrode 5 is provided on the second base 220 and located between the second electrode layer 221 and the support elements 24. The fourth electrode 5 and the second electrode layer 221 are mutually insulated. In the process of bonding the dye liquid crystal cells 2 under high temperature and high pressure conditions, the third electrode 4 and the fourth electrode 5 are energized to form a vertical electric field therebetween, in which the dielectric elastomer in the body of each support element 24 extends along the power line direction, and contracts in the plane perpendicular to the power line direction so that the body is elongated along the power line direction with deformation of the dielectric elastomer under the electric field, and contracts in the plane perpendicular to the power line direction, thereby preventing height reduction of the support elements 24 caused by the fluidity of the adhesive layer 3 under the high temperature and high pressure, and thus preventing reduction of the cell gap of the dye liquid crystal cell 2 in the peripheral region 102.

In some embodiments, a first insulation layer 6 is provided between the third electrode 4 and the first electrode layer 211; and a second insulation layer 7 is provided between the fourth electrode 5 and the second electrode layer 221. The first insulation layer 6 and the second insulation layer 7 respectively extend from the peripheral region 102 to the central region 101, and have orthographic projections on the first base 210 covering the whole first base 210.

In some embodiments, the first substrate 21 further includes a first alignment film 212; the second substrate 22 further includes a second alignment film 222; the first alignment film 212 and the second alignment film 222 are in contact with two ends of the support elements 24, respectively; and the first alignment film 212 and the second alignment film 222 have a same alignment direction. The first alignment film 212 and the second alignment film 222 are provided such that initial alignments of the liquid crystal molecules and the dichroic dye molecules when the first electrode layer 211 and the second electrode layer 221 are not energized is facilitated.

In some embodiments, the alignment directions of the alignment films in the upper and lower dye liquid crystal cells 2 are perpendicular to each other.

Figure 6:
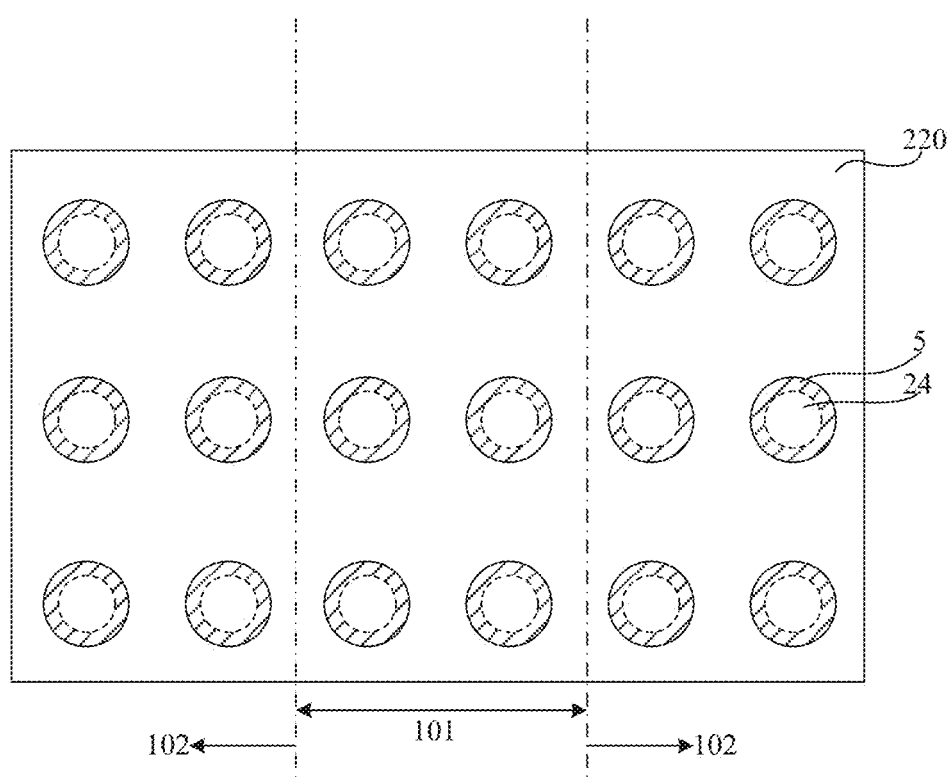
FIG. 6 is a schematic top view of another structure of a dimming glass according to an embodiment of the present disclosure.

In some embodiments, referring to FIG. 6, to ensure surface flatness of the substrate on which the first alignment film 212 and the second alignment film 222 are formed and attached, the third electrode 4 and the fourth electrode 5 may be provided in regions of the support elements 21 on the first substrate 21 and the second substrate 22 in the central region 101, respectively, except that the two electrodes are not energized in the bonding process of the dye liquid crystal cells 2 under high temperature and high pressure conditions. When the cell gap in the central region 101 is to be adjusted, the third electrode 4 and the fourth electrode 5 in the central region 101 can be energized.

In some embodiments, the glass substrate 1 is made of a tempered glass, and the glass substrate 1 and the dye liquid crystal cell 2 are bonded together via an adhesive layer 3 of a polyvinyl butyral material or an adhesive of other materials.

Based on the above structure of the dimming glass, an embodiment of the present disclosure further provides a method for fabricating the dimming glass, which includes the following steps S01 to S02. At step S01: forming a dye liquid crystal cell, and forming a cell gap adjusting structure in the dye liquid crystal cell.

In this step, forming the dye liquid crystal cell includes: forming a first substrate, a second substrate and a support element. The support element is formed on the first substrate or the second substrate.

Forming the cell gap adjusting structure includes: forming a dielectric elastomer and an electrode structure.

A dielectric elastomer material is mixed with a material for a body of the support element to form a pattern of the support element through a conventional patterning process (including the steps of film coating, exposure and development). In formation of the first substrate and the second substrate, the electrode structure is formed on the first substrate and the second substrate through a patterning process or an evaporation process. In this embodiment, a third electrode and a fourth electrode are respectively formed on the first substrate and the second substrate.

In some embodiments, the electrode layers of the first substrate and the second substrate and the third electrode and the fourth electrode are respectively formed through a conventional patterning process (including the steps of film formation, exposure, development, etching, and the like) or evaporation process, which are not described in detail here.

In this step, forming the dye liquid crystal cell further includes: respectively coating an alignment film layer liquid on the first substrate and the second substrate, and then forming a first alignment film and a second alignment film through a rubbing process. Finally, a sealant is applied to the first substrate, and liquid crystal and dichroic dyes are dripped on the second substrate; and the first substrate and the second substrate are assembled to form the dye liquid crystal cell. Another dye liquid crystal cell is formed in a same manner.

At step S02: sequentially attaching the dye liquid crystal cell to a glass substrate via an adhesive layer through heating and pressurizing; and adjusting a cell gap of the dye liquid crystal cell to be consistent by the cell gap adjusting structure during the process.

Figure 7:
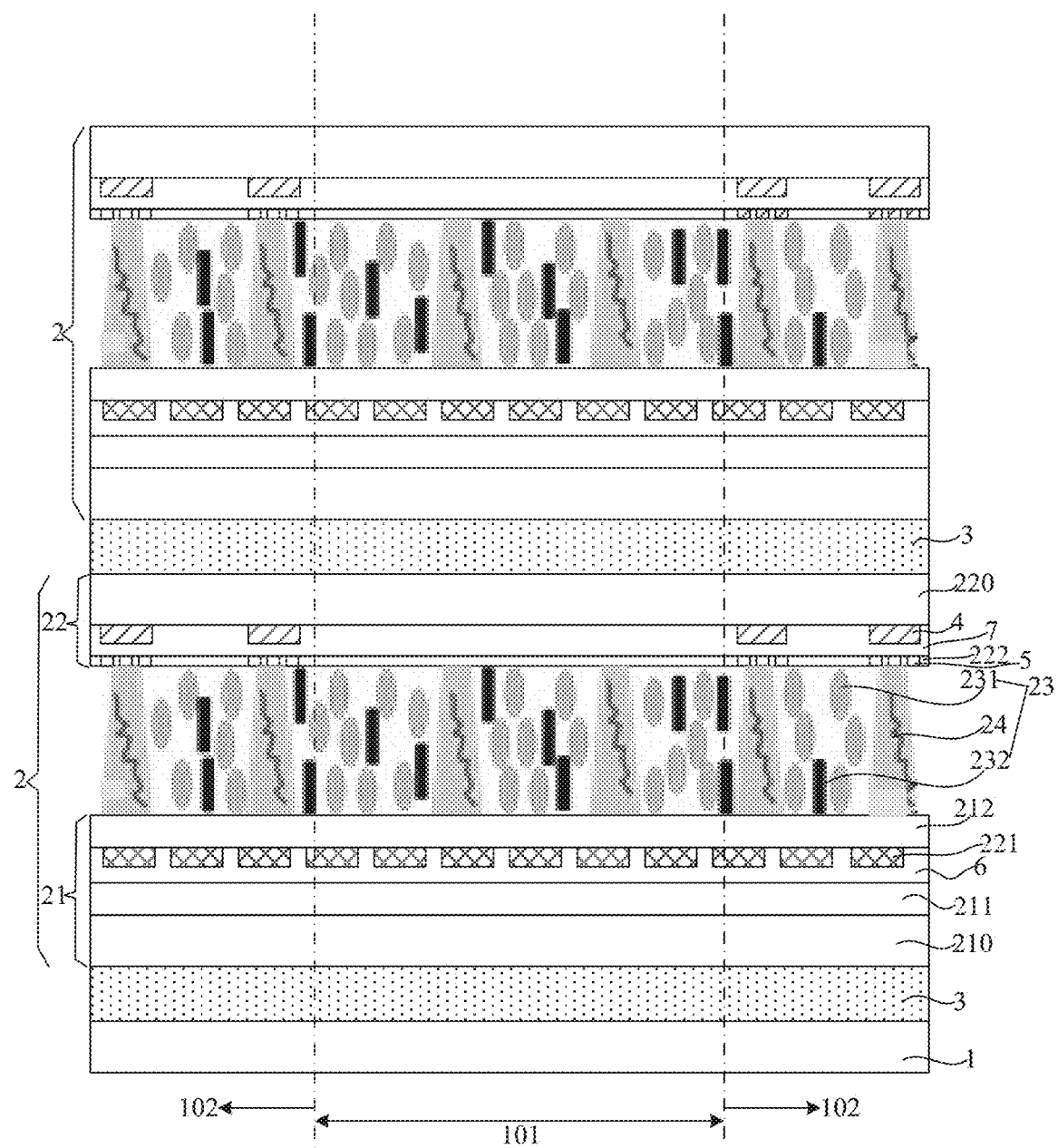
FIG. 7 is a schematic sectional view of yet another structure of a dimming glass according to an embodiment of the present disclosure.

An embodiment of the present disclosure further provides a dimming glass in which, unlike the above embodiments and referring to FIG. 7, the first substrate 21 includes a first base 210, a first electrode layer 211 and a second electrode layer 221. The first electrode layer 211 and the second electrode layer 221 are sequentially stacked on the first base 210, and mutually insulated. The second substrate 22 includes a second base 220. The first electrode layer 211 and the second electrode layer 221 are located between the support elements 24 and the first base 210, the first electrode layer 211 is a plane electrode, and the second electrode layer 221 is a slit electrode.

A first insulation layer 6 is provided between the first electrode layer 211 and the second electrode layer 221 to insulate the two from each other. When the first electrode layer 211 and the second electrode layer 221 are energized, an advanced super dimension switch (ADS) electric field may be formed between the two. When the dimming glass is used for light control, under the ADS electric field formed between the first electrode layer 211 and the second electrode layer 221, liquid crystal molecules and dichroic dye molecules in the cell gap of the dye liquid crystal cell 2 can be synchronously deflected to implement adjustment of a light amount transmitted through the dimming glass.

In some embodiments, the electrode structure includes a third electrode 4 and a fourth electrode 5. The third electrode 4 and the fourth electrode 5 are mutually insulated. The third electrode 4 and the fourth electrode 5 are sequentially stacked on the second substrate 22 and located between the second substrate 22 and the support elements 24. The third electrode 4 is a plane electrode, and the fourth electrode 5 is a slit electrode.

A second insulation layer 7 is provided between the third electrode 4 and the fourth electrode 5 so that the third electrode 4 and the fourth electrode 5 are mutually insulated. When the third electrode 4 and the fourth electrode 5 are energized, an advanced super dimension switch (ADS) electric field may be formed between the two, and decomposed in a direction perpendicular to the first substrate 21 and the second substrate 22 to form a vertical electric field. In the process of bonding the dye liquid crystal cells 2 under high temperature and high pressure conditions, the dielectric elastomer in the body of each support element 24 extends along the power line direction in the vertical electric field, and contracts in the plane perpendicular to the power line direction so that the body is elongated along the power line direction with deformation of the dielectric elastomer under the electric field, and contracts in the plane perpendicular to the power line direction, thereby preventing height reduction of the support elements 24 caused by the fluidity of the adhesive layer 3 under the high temperature and high pressure, and thus preventing reduction of the cell gap of the dye liquid crystal cell 2 in the peripheral region 102.

Figure 8:
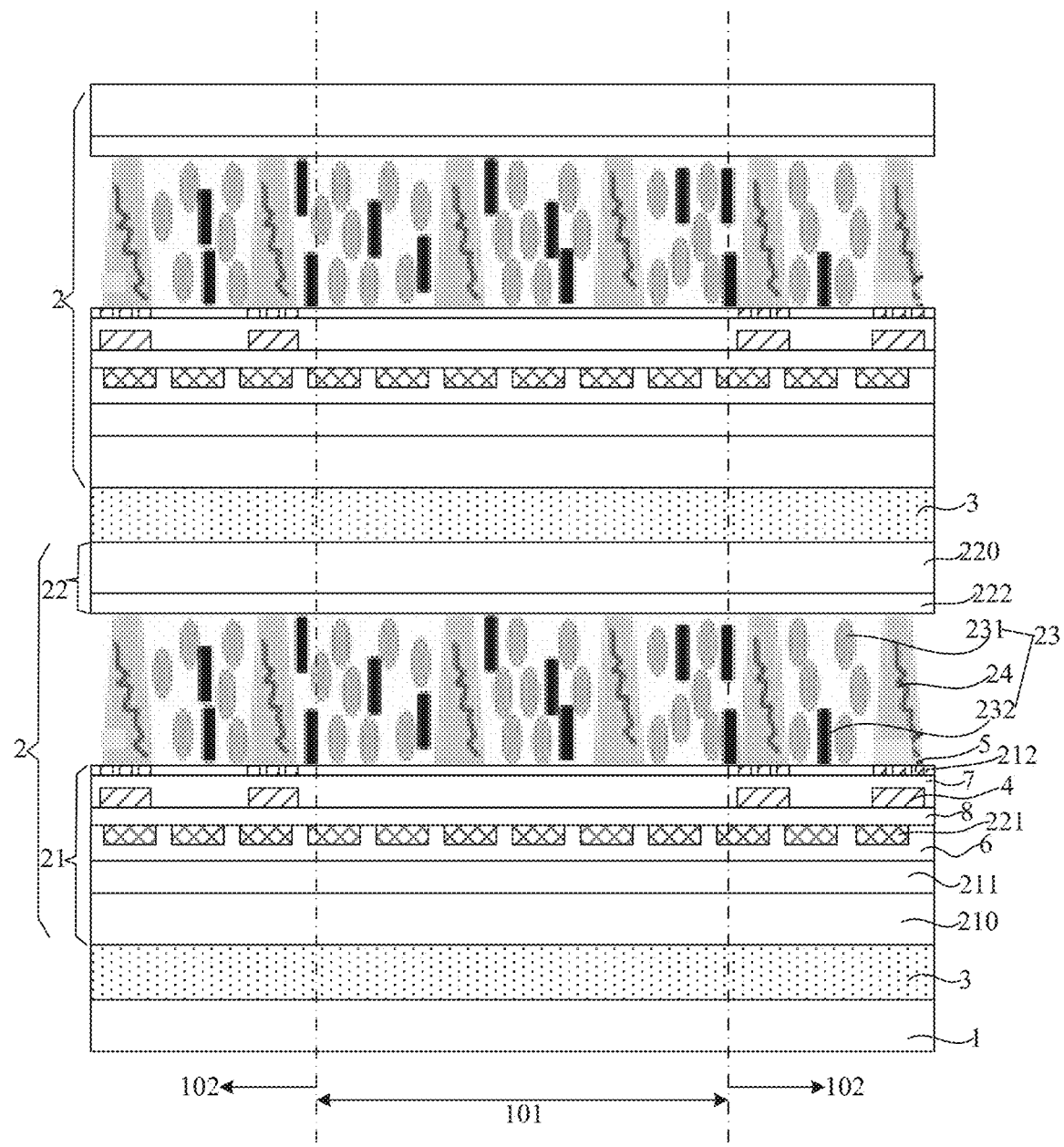
FIG. 8 is a schematic sectional view of yet another structure of a dimming glass according to an embodiment of the present disclosure.

In some embodiments, referring to FIG. 8, the third electrode 4 and the fourth electrode 5 may be sequentially stacked on the first substrate 21 and located between the second electrode layer 221 and the support elements 24. The third electrode 4 and the second electrode layer 221 are mutually insulated. A third insulation layer 8 is provided between the third electrode 4 and the second electrode layer 221 to insulate the two from each other.

Other structures of the dimming glass in this embodiment are the same as those described in the above embodiments, and thus are not repeated here.

Based on the above structure of the dimming glass, an embodiment of the present disclosure further provides a method for fabricating the dimming glass in which, unlike the method in the above embodiment, both the first electrode layer and the second electrode layer are formed in the first substrate, and both the third electrode and the fourth electrode are formed on the second substrate, or both the third electrode and the fourth electrode are formed on the first substrate.

Other steps of the method for fabricating the dimming glass in this embodiment are the same as those in the above embodiment, and thus are not repeated here.

Figure 9:
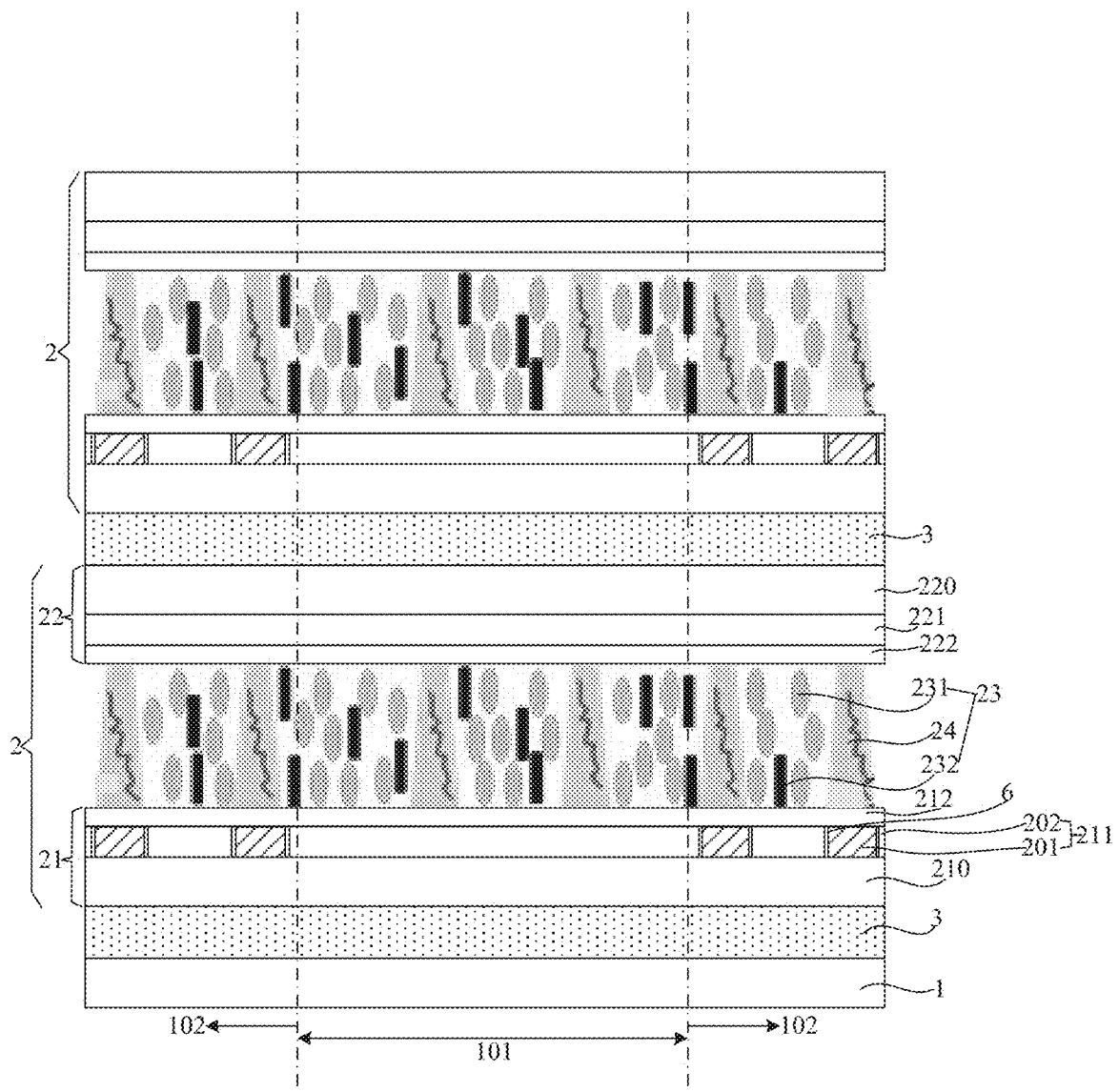
FIG. 9 is a schematic sectional view of yet another structure of a dimming glass according to an embodiment of the present disclosure.
Figure 10:
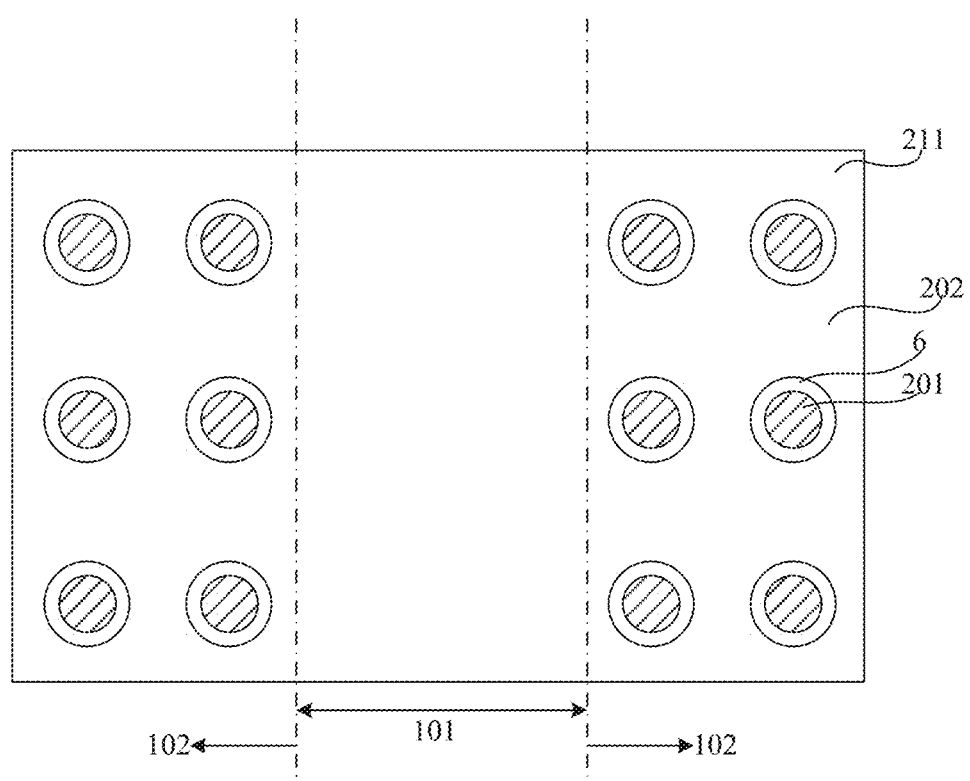
FIG. 10 is a schematic top view of a structure of a first electrode layer in the dimming glass of FIG. 9.

An embodiment of the present disclosure further provides a dimming glass in which, unlike the above embodiments and referring to FIGS. 9 and 10, the first electrode layer 211 includes a first pattern 201 and a second pattern 202. The first pattern 201 and the second pattern 202 are mutually insulated. An orthographic projection of the first pattern 201 on the first base 210 is overlapped with an orthographic projection of the support elements 24 on the first base 210. An orthographic projection of the second pattern 202 on the first base 210 is overlapped with an orthographic projection of other region than a region where the support elements 24 are located on the first base 210.

The first pattern 201 and the second pattern 202 are spaced apart from each other to realize the mutual insulation therebetween; or, the first insulation layer 6 may be further provided in a spacing region between the first pattern 201 and the second pattern 202 to further realize the mutual insulation of the two.

In some embodiments, the first pattern 201 and the second electrode layer 221 are reused as the electrode structure. That is, in this embodiment, the electrode structure does not need to be manufactured separately. In the process of bonding the dye liquid crystal cells 2 under high temperature and high pressure conditions, the first pattern 201 and the second electrode layer 221 are energized to form a vertical electric field therebetween, in which the dielectric elastomer in the body of each support element 24 extends along the power line direction, and contracts in the plane perpendicular to the power line direction so that the body is elongated along the power line direction with deformation of the dielectric elastomer under the electric field, and contracts in the plane perpendicular to the power line direction, thereby preventing height reduction of the support elements 24 caused by the fluidity of the adhesive layer 3 under the high temperature and high pressure, and thus preventing reduction of the cell gap of the dye liquid crystal cell 2 in the peripheral region 102.

In some embodiments, when the dimming glass is used for light control, the first pattern 201 is not energized, while the second pattern 202 and the second electrode layer 221 are energized, and under the vertical electric field formed between the second pattern 202 and the second electrode layer 221, liquid crystal molecules and dichroic dye molecules in the cell gap of the dye liquid crystal cell 2 can be synchronously deflected to implement adjustment of a light amount transmitted through the dimming glass.

Figure 11:
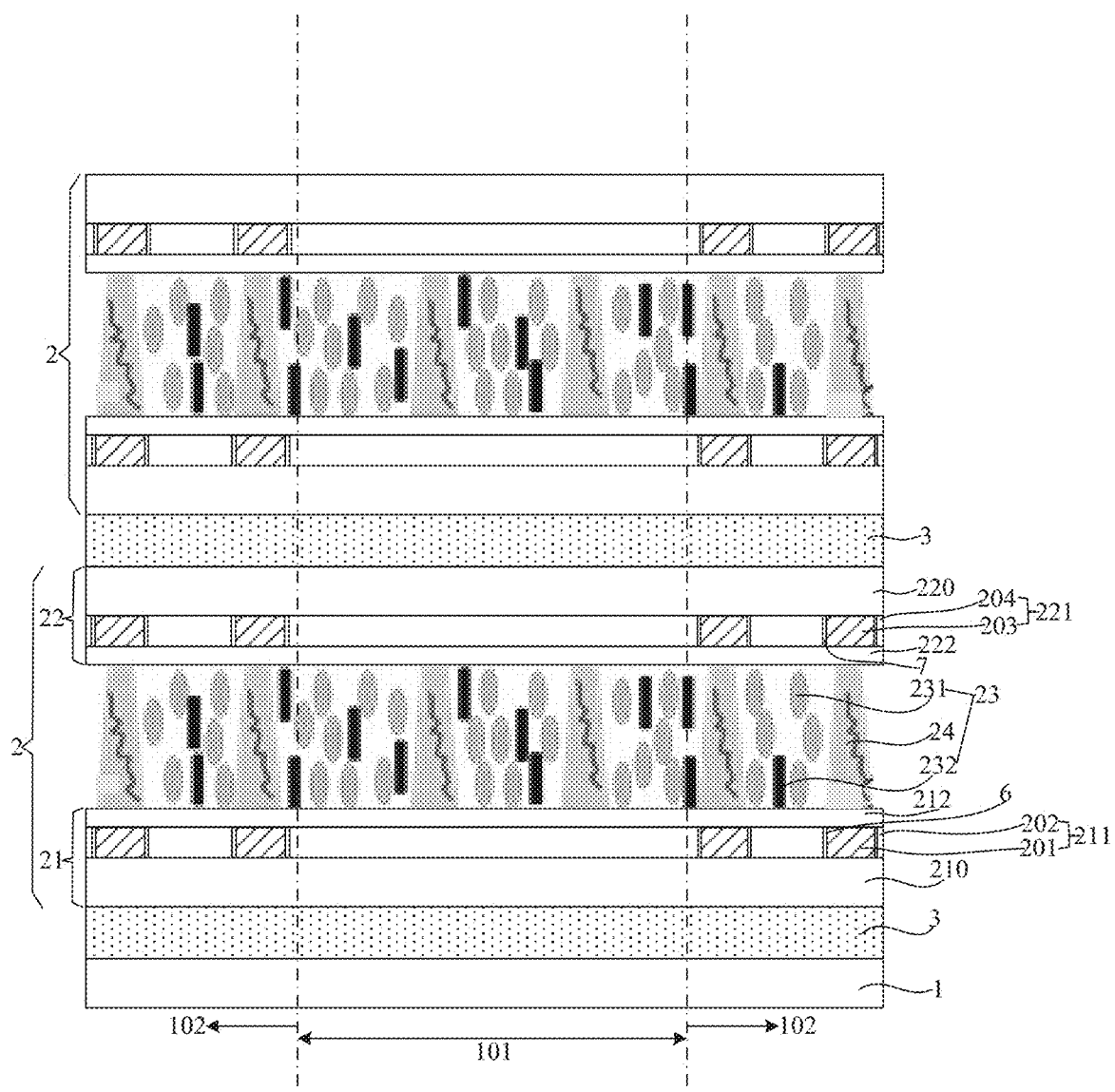
FIG. 11 is a schematic sectional view of yet another structure of a dimming glass according to an embodiment of the present disclosure.
Figure 12:
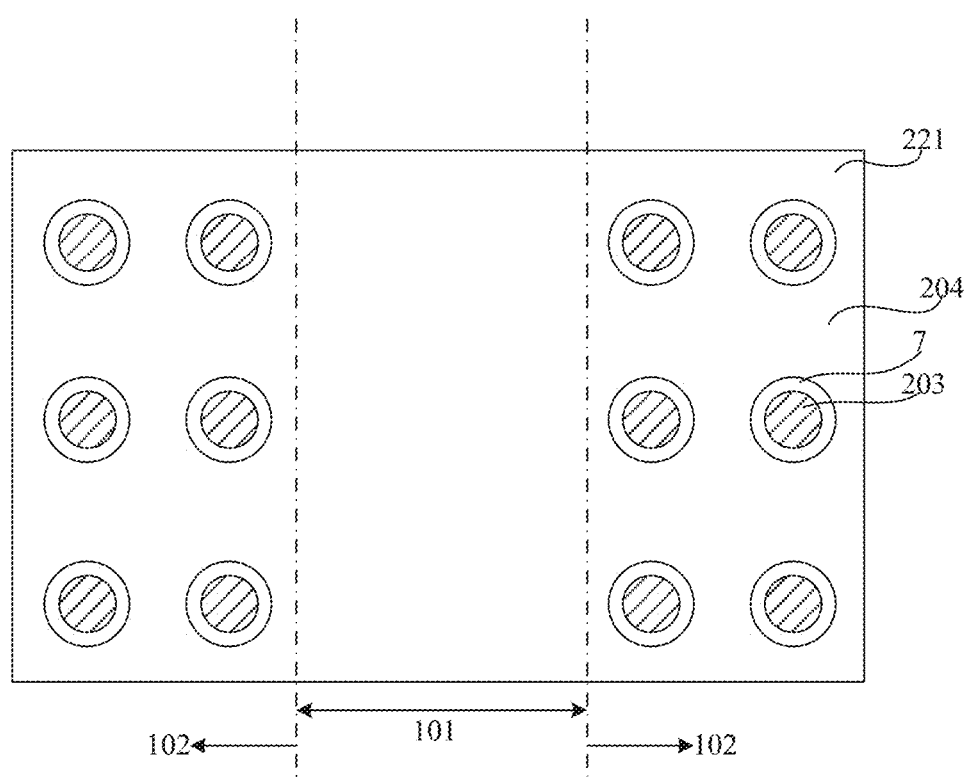
FIG. 12 is a schematic top view of a structure of a second electrode layer in the dimming glass of FIG. 11.

In some embodiments, referring to FIGS. 11 and 12, the second electrode layer 221 includes a third pattern 203 and a fourth pattern 204 204 mutually insulated. An orthographic projection of the third pattern 203 on the second base 220 is overlapped with an orthographic projection of the support elements 24 on the second base 220. An orthographic projection of the fourth pattern 204 on the second base 220 is overlapped with an orthographic projection of other region than a region where the support elements 24 are located on the second base 220.

The third pattern 203 and the fourth pattern 204 are spaced apart from each other to realize the mutual insulation of the two; or, the second insulation layer 7 may be further provided in a spacing region between the third pattern 203 and the fourth pattern 204 to further realize the mutual insulation of the two.

In some embodiments, it is also possible that the third pattern 203 and the first electrode layer 211 are reused as the electrode structure. In the process of bonding the dye liquid crystal cells 2 under high temperature and high pressure conditions, the third pattern 203 and the first electrode layer 211 are energized to form a vertical electric field therebetween, in which the dielectric elastomer in the body of each support element 24 extends along the power line direction, and contracts in the plane perpendicular to the power line direction so that the body is elongated along the power line direction with deformation of the dielectric elastomer under the electric field, and contracts in the plane perpendicular to the power line direction, thereby preventing height reduction of the support elements 24 caused by the fluidity of the adhesive layer 3 under the high temperature and high pressure, and thus preventing reduction of the cell gap of the dye liquid crystal cell 2 in the peripheral region 102.

In some embodiments, when the dimming glass is used for light control, the third pattern 203 is not energized, while the fourth pattern 204 and the first electrode layer 211 are energized, and under the vertical electric field formed between the fourth pattern 204 and the first electrode layer 211, liquid crystal molecules and dichroic dye molecules in the cell gap of the dye liquid crystal cell 2 can be synchronously deflected to implement adjustment of a light amount transmitted through the dimming glass.

In some embodiments, it is also possible that the first pattern 201 and the third pattern 203 are reused as the electrode structure. In the process of bonding the dye liquid crystal cells 2 under high temperature and high pressure conditions, the first pattern 201 and the third pattern 203 are energized to form a vertical electric field therebetween, in which the dielectric elastomer in the body of each support element 24 extends along the power line direction, and contracts in the plane perpendicular to the power line direction so that the body is elongated along the power line direction with deformation of the dielectric elastomer under the electric field, and contracts in the plane perpendicular to the power line direction, thereby preventing height reduction of the support elements 24 caused by the fluidity of the adhesive layer 3 under the high temperature and high pressure, and thus preventing reduction of the cell gap of the dye liquid crystal cell 2 in the peripheral region 102.

In some embodiments, when the dimming glass is used for light control, the first pattern 201 and the third pattern 203 are not energized, while the second pattern 202 and the fourth pattern 204 are energized, and under the vertical electric field formed between the second pattern 202 and the fourth pattern 204, liquid crystal molecules and dichroic dye molecules in the cell gap of the dye liquid crystal cell 2 can be synchronously deflected to implement adjustment of a light amount transmitted through the dimming glass.

Other structures of the dimming glass in this embodiment are the same as those described in the above embodiments, and thus are not repeated here.

Based on the above structure of the dimming glass, the embodiment further provides a method for fabricating the dimming glass in which, unlike the method for fabricating the dimming glass in the above embodiment, the third electrode and the fourth electrode respectively on the first substrate and/or the second substrate of a first dye liquid crystal cell are omitted, thereby reducing the fabrication cost of the dimming glass.

Other steps of the method for fabricating the dimming glass in this embodiment are the same as those in the above embodiment, and thus are not repeated here.

According to the dimming glass in the above embodiments, by providing the cell gap adjusting structure in at least the peripheral region of the dye liquid crystal cell, in the process of bonding the dye liquid crystal cells under high temperature and high pressure conditions, the electrode structure in the peripheral region can generate, when being energized, a vertical electric field in which the dielectric elastomer extends along a power line direction, and contracts in the plane perpendicular to the power line direction so that the body is elongated along the power line direction with deformation of the dielectric elastomer under the electric field, and contracts in the plane perpendicular to the power line direction, thereby preventing height reduction of the support elements caused by the fluidity of the adhesive layer under the high temperature and high pressure, and thus preventing reduction of the cell gap of the dye liquid crystal cell in the peripheral region. Finally, it is ensured that the cell gap of the dye liquid crystal cell tends to be the same in the peripheral region and in the central region, and the local blackening in the area with a smaller cell gap of the peripheral region is avoided.

An embodiment of the present disclosure further provides a transportation device, including the dimming glass according to any one of the above embodiments and used as a window glass of the transportation device.

By adopting the dimming glass according to any one of the above embodiments, on one hand, a light amount transmitted can be adjusted by the window glass of the transportation device, so that the light transmittance of the window glass in a dark state is further reduced, while the contrast is improved, and on the other hand, local blackening on the window glass of the transportation device can be avoided, thereby improving the aesthetic degree of the window glass of the transportation device.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A dimming glass, comprising:
a glass substrate; and
at least two dye liquid crystal cells on the glass substrate; wherein the at least two dye liquid crystal cells are mutually stacked and bonded with each other via an adhesive layer; and
at least one of the dye liquid crystal cells comprises a central region and a peripheral region surrounding a periphery of the central region; and
wherein the at least one of the dye liquid crystal cells comprises a cell gap adjusting structure in at least the peripheral region, and the cell gap adjusting structure is configured to adjust a cell gap of the at least one of the dye liquid crystal cells to be consistent,
the at least one of the dye liquid crystal cells comprises a first substrate, a second substrate, dye liquid crystals, and a plurality of support elements, the first substrate and the second substrate are assembled to form a cell gap in which the dye liquid crystals are disposed; the plurality of support elements are distributed between the first substrate and the second substrate at intervals, and configured to support the first substrate and the second substrate; and each support element comprises a body;

the cell gap adjusting structure comprises a dielectric elastomer and an electrode structure; the dielectric elastomer is in the body and the electrode structure is on the first substrate and/or the second substrate, and an orthographic projection of the electrode structure on the first substrate is overlapped with an orthographic projection of the support elements on the first substrate; and the at least one of the dye liquid crystal cells further comprises a first electrode layer and a second electrode layer, each of which is disposed in the first substrate or the second substrate, light amount transmitted through the dimming glass is adjusted under an electric field formed between the first electrode layer and the second electrode layer, the first electrode layer comprises a first pattern and a second pattern mutually insulated, the first pattern has an orthographic projection on the first substrate overlapped with an orthographic projection of the support elements on the first substrate and constitutes part of the electrode structure, and an orthographic projection of the second pattern on the first substrate is overlapped with an orthographic projection of other region than a region where the support elements are located on the first substrate.

2. The dimming glass according to claim 1, wherein the plurality of support elements are disposed in both the central region and the peripheral region, and the dielectric elastomer is in the bodies of the plurality of support elements in both the central region and the peripheral region.

3. The dimming glass according to claim 1, wherein the first substrate comprises a first base and the first electrode layer on the first base;
the second substrate comprises a second base and the all second electrode layer on the second base; and
the support elements are on a side of the first electrode layer facing away from the first base and on a side of the second electrode layer facing away from the second base.

4. The dimming glass according to claim 3, wherein the first pattern and the second electrode layer are reused as the electrode structure.

5. The dimming glass according to claim 3, wherein the second electrode layer comprises a third pattern and a fourth pattern mutually insulated;
an orthographic projection of the third pattern on the second base is overlapped with an orthographic projection of the support elements on the second base; and an orthographic projection of the fourth pattern on the second base is overlapped with an orthographic projection of other region than the region where the support elements are located on the second base.

6. The dimming glass according to claim 5, wherein the third pattern and the first electrode layer are reused as the electrode structure.

7. The dimming glass according to claim 5, wherein the first pattern and the third pattern are reused as the electrode structure.

8. The dimming glass according to claim 1, wherein the first substrate comprises a first base, the first electrode layer and the second electrode layer, the first electrode layer and the second electrode layer are sequentially stacked on the first base, and mutually insulated;
the second substrate comprises a second base; and the first electrode layer and the second electrode layer are between the support elements and the first base, the first electrode layer is a plane electrode, and the second electrode layer is a slit electrode.

9. The dimming glass according to claim 8, wherein the first pattern and the second electrode layer are reused as the electrode structure.

10. The dimming glass according to claim 8, wherein the second electrode layer comprises a third pattern and a fourth pattern mutually insulated;
an orthographic projection of the third pattern on the second base is overlapped with an orthographic projection of the support elements on the second base; and
an orthographic projection of the fourth pattern on the second base is overlapped with an orthographic projection of other region than the region where the support elements are located on the second base.

11. The dimming glass according to claim 10, wherein the third pattern and the first electrode layer are reused as the electrode structure.

12. The dimming glass according to claim 1, wherein the first substrate further comprises a first alignment film; the second substrate further comprises a second alignment film; and
the first alignment film and the second alignment film are in contact with two ends of the support elements, respectively.

13. The dimming glass according to claim 1, wherein a material of the dielectric elastomer comprises acrylic or polyurethane; the body is made of a photoresist material;
the dye liquid crystals comprise liquid crystals and dichroic dyes; and
the adhesive layer is made of a polyvinyl butyral material.

14. A method for fabricating a dimming glass, wherein the dimming glass is the dimming glass according to claim 1, and the method comprises:
forming dye liquid crystal cells, and forming a cell gap adjusting structure in the at least one of the dye liquid crystal cells; and
sequentially attaching the at least one of the dye liquid crystal cells to a glass substrate via an adhesive layer through heating and pressurizing; wherein a cell gap of the at least one of the dye liquid crystal cell is adjusted to be consistent by the cell gap adjusting structure during the attaching.

15. The method according to claim 14, wherein forming the at least one of the dye liquid crystal cells comprises: forming a first substrate, a second substrate and a support element; wherein the support element is formed on the first substrate or the second substrate;
forming the cell gap adjusting structure comprises: forming a dielectric elastomer and an electrode structure;
wherein a material of the dielectric elastomer is mixed with a material of a body of the support element to form a pattern of the support element through a patterning process; and
in formation of the first substrate and the second substrate, the electrode structure is formed on the first substrate and/or the second substrate through a patterning process or an evaporation process.

16. A transportation device, comprising a window glass, wherein the window glass comprises a dimming glass, and the dimming glass comprises:
a glass substrate; and
at least two dye liquid crystal cells on the glass substrate;
wherein the at least two dye liquid crystal cells are mutually stacked and bonded with each other via an adhesive layer; and
at least one of the dye liquid crystal cells comprises a central region and a peripheral region surrounding a periphery of the central region; and
wherein the at least one of the dye liquid crystal cells comprises a cell gap adjusting structure in at least the peripheral region, and the cell gap adjusting structure is configured to adjust a cell gap of the at least one of the dye liquid crystal cells to be consistent,
the at least one of the dye liquid crystal cells comprises a first substrate, a second substrate, dye liquid crystals, and a plurality of support elements, the first substrate and the second substrate are assembled to form a cell gap in which the dye liquid crystals are disposed; the plurality of support elements are distributed between the first substrate and the second substrate at intervals, and configured to support the first substrate and the second substrate; and each support element comprises a body;
the cell gap adjusting structure comprises a dielectric elastomer and an electrode structure; the dielectric elastomer is in the body and the electrode structure is on the first substrate and/or the second substrate, and an orthographic projection of the electrode structure on the first substrate is overlapped with an orthographic projection of the support elements on the first substrate; and
the at least one of the dye liquid crystal cells further comprises a first electrode layer and a second electrode layer, each of which is disposed in the first substrate or the second substrate, light amount transmitted through the dimming glass is adjusted under an electric field formed between the first electrode layer and the second electrode layer, the first electrode layer comprises a first pattern and a second pattern mutually insulated, the first pattern has an orthographic projection on the first substrate overlapped with an orthographic projection of the support elements on the first substrate and constitutes part of the electrode structure, and an orthographic projection of the second pattern on the first substrate is overlapped with an orthographic projection of other region than a region where the support elements are located on the first substrate.

* * * * *